C. A. BORNSTEDT.
GRAIN MEASURING DEVICE.
APPLICATION FILED MAY 31, 1913.
1,119,059.
Patented Dec. 1, 1914.
2 SHEETS—SHEET 1.
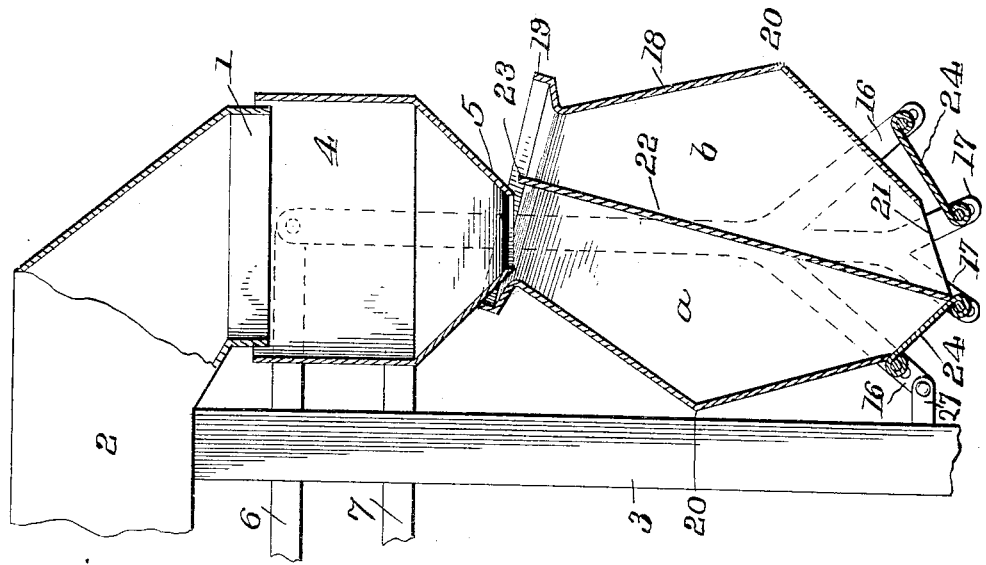
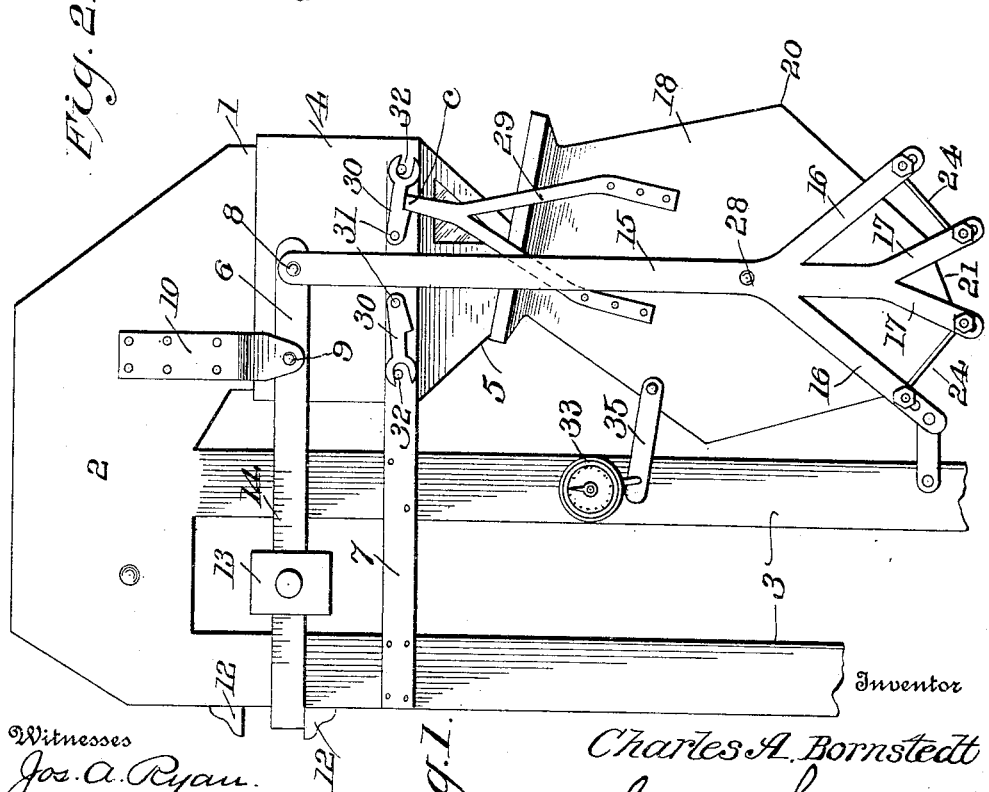
Witnesses
Jos. A. Ryan.
May Barnes
Inventor
Charles A. Bornstedt
By George W. Sues.
Attorney

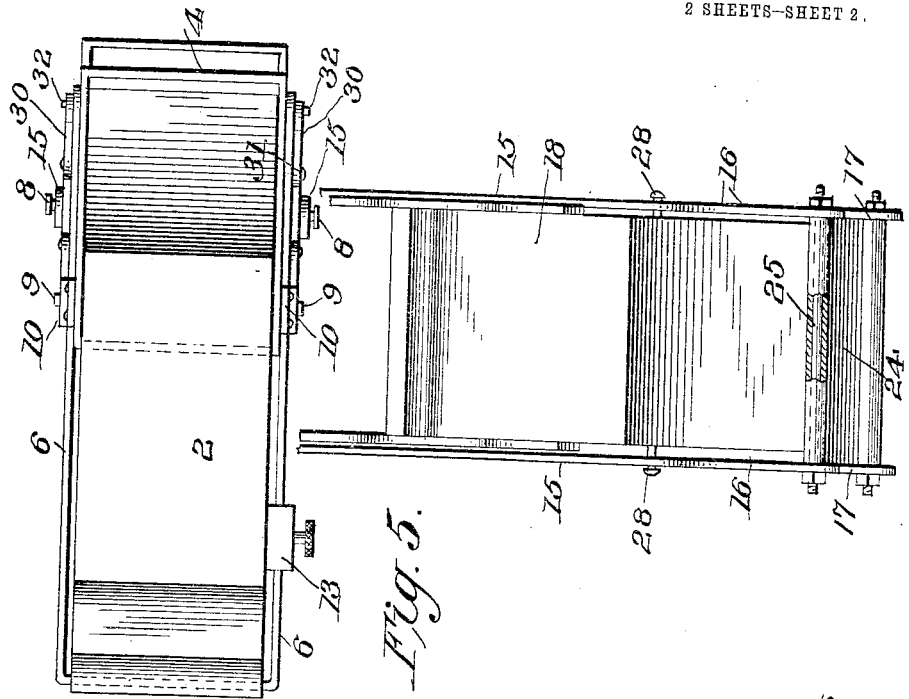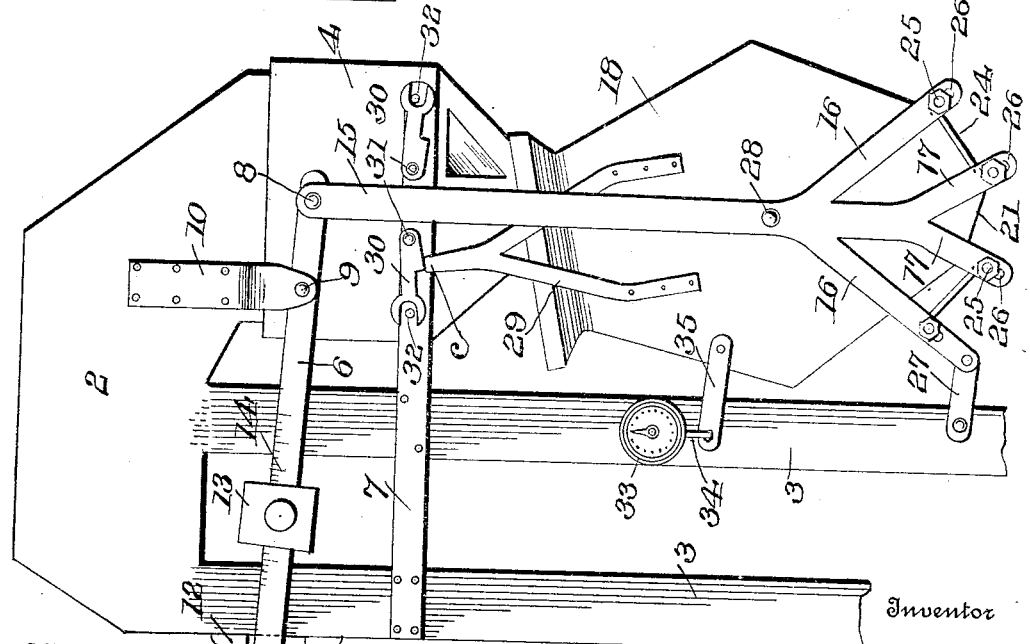

UNITED STATES PATENT OFFICE.

CHARLES A. BORNSTEDT, OF EPPING, NORTH DAKOTA.

GRAIN-MEASURING DEVICE.

1,119,059.  Specification of Letters Patent.  Patented Dec. 1, 1914.

Application filed May 31, 1913. Serial No. 770,943.

*To all whom it may concern:*

Be it known that I, CHARLES A. BORNSTEDT, a citizen of the United States, and a resident of Epping, in the county of Williams and State of North Dakota, have invented certain new and useful Improvements in Grain-Measuring Devices, of which the following is a specification, reference being had to the accompanying drawings.

This invention relates to grain weighing devices adapted to be used in connection with threshing machines and one of the principal objects of the invention is to provide a device adapted to be connected to the discharge end of the grain elevator of a threshing machine for automatically weighing and discharging grain and keeping tally of the number of bushels discharged.

Another object of the invention is to provide an automatically operated weighing device for threshing machines which will be reliable and efficient in use and which will accurately weigh the grain as it is discharged from the lower end of the grain elevator and which will operate efficiently under varying conditions and with grains of various weights and kinds.

These and other objects may be attained by means of the construction illustrated in the accompanying drawings, in which:

Figure 1 is a view in side elevation of a weighing device made in accordance with my invention and connected to the discharge end of a threshing machine grain elevator; Fig. 2 is a central vertical section through the hopper and the measure with the latter in one of its positions; Fig. 3 is a side elevation showing the measure in its other position as compared to Fig. 1; Fig. 4 is a top plan view; Fig. 5 is an end elevation with portions broken away.

Referring to the drawings, the numeral 1 designates the discharge end of an elevator 2 adapted to be connected to a threshing machine and provided with suitable supports 3. The discharge end 2 of the elevator is disposed immediately above a hopper 4 having a contracted lower end 5. The hopper 4 is supported upon bars 7. The scale-beam 6 is connected by a pin 8 to the hanger 15, said pin 8 serving as a pivot for the scale-beam 6, said bar being also pivoted at 9 upon the lower end of a bracket 10 secured to the side of the elevator 2. The scale-beam 6 is bent at right angles at 11 and extends around to the other side of the hopper 4 and is pivoted in a manner identical with that described. A pair of stops 12 serve to limit the vertical movement of the scale-beam 6 and a sliding weight 13 is mounted on said scale-beam and the latter may be provided with scale marks 14. Supported upon the pins 8 upon opposite sides of the hopper 4 are bars 15 said bars having divergent members 16 and 17 at their lower ends.

The bucket 18 has a flange 19 at its upper end and said bucket is gradually enlarged from the upper end to the point 20 and from the point 20 to the lower end is gradually contracted and provided with inclined openings 21. Connected centrally and extending vertically from bottom to top of the bucket is a partition 22, the upper edge 23 of which is disposed immediately below the discharge opening in the hopper 4. Connected to each of the members 16 and 17 are the closures 24, said closures each comprising a plate adapted to close the opening 21 on the opposite sides of the partition 22 at the bottom. The closure plates 24 are bent at their ends and surround bolts 25, said bolts being adjustable in slots 26 in the members 16 and 17. One of the members 16 is connected by a link 27 to the support 3. The bucket 18 is pivoted upon the rivets 28 extending through the bars 15.

Connected to the opposite sides of the bucket 18 are brackets 29, the upper ends of which are adapted to engage pivoted latches 30. The latches 30 are pivoted on the pins 31 and the outer ends of said latches are bifurcated or separated and limited in their movements by means of the pins 32.

A tallying device 33 is secured to the support 3 and connected to the pawl or pendulum 34 is a link 35 connected at its opposite end to the bucket 18.

The operation of my invention may be briefly described as follows: When the bucket 18 is in the position shown in Figs. 1 and 2, of the drawings, the grain will be discharged in the compartment *a* upon one side of the partition 22 and the bottom or discharge opening of the compartment is closed by the member 24. When the compartment *a* is filled with grain, the bucket 18 by its weight pulls down upon the bar 6 to the position shown in Fig. 3 of the drawing, said bucket swinging upon the pivotal point 28 and discharging the contents of compartment *a* which may be a half bushel of the grain. The lower edge of the discharge opening in the hopper 4 scrapes off the surplus grain and throws it into compartment *b* by passing over the upper edge 23 of the partition 22. When the bucket 18 is in the position shown in Fig. 3, the compartment *b* is closed at its discharge end by the closure 24 and the grain is discharged from the hopper 4 into this compartment. It is to be noted that as the bucket 18 drops to the position shown in Fig. 3, the upper end *c* of the bracket 29 is withdrawn from the latch 30 at the right hand side of Fig. 3 and extends over and drops into the recess of the latch at the left hand side, as will be understood, after which the grain having been discharged the scale-beam 6 assumes its horizontal position owing to the excess of the sliding weight 13. At each movement of the bucket 18, the tally is moved to keep exact account of the number of bushels discharged.

From the foregoing, it will be obvious that a grain weighing device made in accordance with my invention is comparatively simple in construction, will operate automatically on nearly all kinds of grains and that the condition of the grain may be compensated for by slight adjustment whenever required by sliding weight 13 on the bar 6.

My invention is comparatively simple in construction, cannot readily get out of order and will operate smoothly and accurately without liability of breaking.

I claim:

1. A weighing device of the type described, including a pivoted weighted lever, a forked or bifurcated member pivotally connected to said lever and having pairs of divergent branches, each pair having applied thereto a plate-like closure, upon opposite sides of a longitudinal median line extending through said bifurcated member, said bifurcated member having link connection with a fixture, a compartmental bucket pivotally supported from said bifurcated member said bucket having oppositely inclined edges at the discharge-openings in the bottoms of the compartments thereof, said plate-like closures being arranged for alternately engaging said oppositely inclined edges of the bottoms of the bucket-compartments, and means for the automatic retention of said bucket in tilted position.

2. A weighing device of the type described, including a pivoted weighted lever, a bifurcated member pivotally connected to said lever and having pairs of divergent branches, each pair having applied thereto a plate-like closure upon opposite sides of a longitudinal median line extending through said bifurcated member, said bifurcated member having link-connection with a fixture, a compartmental bucket pivotally supported from said bifurcated member, said bucket having oppositely inclined edges at the discharge openings in the bottoms of the compartments thereof, said plate-like closures being arranged for alternately engaging said oppositely inclined edges of the bottoms of the bucket-compartments, said bucket being equipped with a fixed upstanding member, and latches arranged to be engaged by said upstanding member and retain the bucket in tilted position.

In testimony whereof I affix my signature, in the presence of two witnesses.

CHARLES A. BORNSTEDT.

Witnesses:
N. T. ROSENQUIST,
J. A. ROSENQUIST.

Copies of this patent may be obtained for five cents each, by addressing the "Commissioner of Patents, Washington, D. C."